United States Patent
Iwami et al.

(10) Patent No.: US 9,506,127 B2
(45) Date of Patent: Nov. 29, 2016

(54) METHOD FOR PRODUCING SINTERED ORE

(71) Applicant: JFE STEEL CORPORATION, Tokyo (JP)

(72) Inventors: Yuji Iwami, Fukuyama (JP); Tetsuya Yamamoto, Kurashiki (JP); Koichi Nushiro, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 66 days.

(21) Appl. No.: 14/414,867

(22) PCT Filed: May 14, 2013

(86) PCT No.: PCT/JP2013/063353
§ 371 (c)(1),
(2) Date: Jan. 14, 2015

(87) PCT Pub. No.: WO2014/013775
PCT Pub. Date: Jan. 23, 2014

(65) Prior Publication Data
US 2015/0167114 A1 Jun. 18, 2015

(30) Foreign Application Priority Data
Jul. 18, 2012 (JP) ................. 2012-159836

(51) Int. Cl.
C22B 1/20 (2006.01)
C22B 1/22 (2006.01)
C22B 1/16 (2006.01)

(52) U.S. Cl.
CPC . *C22B 1/16* (2013.01); *C22B 1/20* (2013.01); *C22B 1/22* (2013.01)

(58) Field of Classification Search
CPC .................................. C22B 1/22; C22B 1/20
See application file for complete search history.

(56) References Cited

FOREIGN PATENT DOCUMENTS

| JP | S46-027126 B | 8/1971 |
|---|---|---|
| JP | S48-18102 A | 7/1973 |
| JP | S55-018585 A | 2/1980 |
| JP | H05311257 A | 11/1993 |
| JP | 2008291354 A | 12/2008 |
| JP | 2008291362 A | 12/2008 |
| JP | 2010047801 A | 3/2010 |
| JP | 2010-106342 A | 5/2010 |
| JP | 2010126802 A | 6/2010 |
| WO | 2007052776 A1 | 5/2007 |

OTHER PUBLICATIONS

JP 2010-106342 A published May 13, 2010. Machine translation.*

(Continued)

*Primary Examiner* — George Wyszomierski
*Assistant Examiner* — Tima M McGuthry Banks
(74) *Attorney, Agent, or Firm* — Oliff PLC

(57) ABSTRACT

Method for producing sintered ore in which air above a charged layer containing a gaseous fuel supplied from a plurality of gaseous fuel supplying devices installed in a machine length direction on a downstream of an ignition furnace of a sintering machine is sucked by a wind box disposed below a pallet and is introduced into the charged layer, and the gaseous fuel and the carbon material are combusted inside the charged layer to produce the sintered ore, wherein a total amount of supply of the gaseous fuel supplied from the gaseous fuel supplying devices is set to be constant, the amount of supply of the gaseous fuel supplied from each gaseous fuel supplying devices is increased or decreased depending on an amount of air sucked into the charged layer in a region which each gaseous fuel supplying device is installed, thereby optimizing a supply ratio of the gaseous fuel.

17 Claims, 9 Drawing Sheets

(56) References Cited

OTHER PUBLICATIONS

Translation of Aug. 20, 2013 International Search Report issued in International Patent Application No. PCT/JP2013/063353.
Feb. 26, 2016 Office Action issued in Korean Patent Application No. 10-2015-7000420.
Aug. 27, 2015 Office Action issued in Australian Patent Application No. 2013291375.
Jul. 8, 2015 Search Report issued in European Patent Application No. 13820531.5.
Jan. 20, 2015 International Report on Patentability issued in International Patent Application No. PCT/JP2013/063353.
"Mineral Engineering;" Asakura Publishing Co., Ltd.; 1976; p. 175.

* cited by examiner

METHOD FOR PRODUCING SINTERED ORE

TECHNICAL FIELD

The present invention relates to a method for producing a high-quality sintered ore for a blast furnace having high strength and excellent reducibility using a Dwight-Lloyd sintering machine of a downward suction type.

BACKGROUND ART

In general, a sintered ore serving as a main raw material of a blast furnace iron-making method is manufactured through steps illustrated in FIG. 1. The raw material of the sintered ore includes iron ore powder or sintered ore undersize powder, recovery powder occurring in an ironwork, CaO-based auxiliary raw material containing limestone, dolomite or the like, granulating aids such as quick lime, coke breeze, anthracite or the like, and these raw materials are cut on a conveyor at a predetermined rate from each of a hopper 1, . . . . An appropriate amount of water is added to the cut raw materials by drum mixers 2 and 3 or the like, and the cut raw materials are mixed and granulated and converted into sintering raw material as quasi-particles having an average diameter of 3 to 6 mm. Thereafter, the sintering raw materials are charged onto an endless moving type sintering machine pallet 8 from surge hoppers 4 and 5 disposed on the sintering machine via a drum feeder 6 and a cutting chute 7 at a thickness of 400 to 800 mm to form a charged layer 9 that is also referred to as a sintering bed. Thereafter, by igniting the carbon material of the charged layer surface in an ignition furnace 10 provided above the charged layer 9, and by sucking air above the charged layer downward via a wind box 11 disposed directly below the pallet 8, the carbon material in the charged layer is combusted, and the sintering raw material is melted by combustion heat generated at this time to obtain a sintered cake. Thereafter, the sintered cake thus obtained is crushed and regulated in particle size, and agglomerate of about 5 mm or more is recovered as a finished product sintered ore and supplied to the blast furnace.

In the above-described producing process, the carbon material in the charged layer ignited by the ignition furnace 10 then continues to combust by the air sucked toward a lower layer from an upper layer within the charged layer, thereby forming a combustion and melting zone (hereinafter, also simply referred to as "combustion zone") having a width in a thickness direction. Since a molten portion of the combustion zone inhibits the flow of the sucked air, it becomes a factor that the sintering time is extended and productivity decreases. Also, over time, that is, along with the movement of the pallet 8 to the downstream side, the combustion zone is gradually shifted to the lower layer from the upper layer of the charged layer, and after the combustion zone has passed, a sintered cake layer (sintered layer) in which the sintering reaction is completed is generated. Also, as the combustion zone is shifted to the lower layer from the upper layer, water contained in the sintering raw material is vaporized by combustion heat of a carbon material, and concentrated in the sintering raw material of the lower layer in which the temperature has not risen yet, thereby forming a wet zone. When the water concentration reaches a certain level or higher, a void between the sintering raw material particles serving as a flow passage of the suction gas is filled with water, and similarly to the melt zone, this becomes a factor that increases the air-flow resistance.

FIG. 2 illustrates distributions of a pressure loss and a temperature within the charged layer when the combustion zone moving in the charged layer having the thickness of 600 mm is located at a position (below 200 mm from the charged layer surface) of about 400 mm on the palette in the charged layer, and illustrates that the pressure loss distribution at this time is approximately 60% in the wet zone and is approximately 40% in the combustion zone.

Meanwhile, in general, an amount of production (t/hr) of the sintering machine is determined by productivity (t/hr·m$^2$)×sintering machine area (m$^2$). In other words, the amount of production of the sintering machine changes by a machine width or a machine length of the sintering machine, a thickness of the raw material charged layer, a bulk density of the sintering raw material, a sintering (combustion) time, an yield or the like. Therefore, in order to increase the amount of production of sintered ore, it is believed that it is effective to reduce the sintering time by improving air permeability (pressure loss) of the charged layer, or alternatively, to improve the yield by increasing the cold strength of the sintered cake before crushing.

FIG. 3 illustrates the transitions of the temperature and the time at a point in the charged layer when productivity of the sintered ore is high and low, that is, when the pallet movement speed of the sintering machine is high and low. The time kept at a temperature of 1200° C. or higher, at which the sintering raw material starts to melt, is represented by $T_1$ in the case of low productivity and represented by $T_2$ in the case of high productivity. Since the movement speed of the pallet is high when the productivity is high, the high-temperature zone retention time $T_2$ becomes shorter as compared with the time $T_1$ when the productivity is low. The retention time at a high temperature of 1200° C. becomes shorter, the combustion is insufficient, the cold strength of sintered ore is lowered, and the yield is lowered. Therefore, in order to manufacture the high-strength sintered ore with a high yield and with good productivity in a short time, by taking some means, it is necessary to extend the time kept at a high temperature of 1200° C. or higher and increase the cold strength of the sintered ore.

FIG. 4 is a diagram schematically illustrating a process in which the carbon material of the charged layer surface ignited in the ignition furnace continues to combust by the sucked air to form a combustion zone, the combustion zone sequentially moves from the upper layer to the lower layer of the charged layer, and a sintered cake is gradually formed. In addition, FIG. 5($a$) is a diagram schematically illustrating each of the temperature distributions when the combustion zone is present within each layer of an upper layer part, an intermediate layer part, and a lower layer part of the charged layer illustrated within a bold frame in FIG. 4. The strength of the sintered ore is affected by the product of the temperature to be maintained at a temperature of 1200° C. or higher and the time. The greater the value is, the higher the strength of the sintered ore is. Since the combustion heat of the carbon material of the upper layer part of the charged layer is preheated by being carried by the sucked air, the intermediate layer part and the lower layer part of the charged layer are kept at a high temperature for a long time, and meanwhile, in the upper layer part of the charged layer, the combustion heat is insufficient as much as a level that is not preheated, and the combustion melting reaction required for sintering (sintering reaction) is liable to be insufficient. As a result, as illustrated in FIG. 5($b$), in the yield distribution of the sintered ore in the width direction cross-section of the charged layer, the yield is lowered in the upper layer part of the charged layer. Also, both width end portions of the palette cannot ensure a sufficient retention time at a high-temperature zone required for sintering by radiation from the palette side wall and the excessive cooling due to the large amount of passing air, and after all, the yield is lowered.

To solve these problems, conventionally, a method of increasing the carbon material (coke breeze) added to the sintering raw material has been performed. However, by increasing the amount of addition of coke, as illustrated in FIG. 6, it is possible to increase the temperature in the sintered layer and to extend the time kept at 1200° C. or higher. However, at the same time, the highest achieving temperature while sintering exceeds 1400° C., which leads to decreases in reducibility of sintered ore and the cold strength by reasons to be described below.

Non-Patent Document 1 discloses tensile strength (cold strength) of various minerals generated in the sintered ore during the sintering process and the reducibility as in Table 1. Moreover, FIG. 7 illustrates that, during the sintering process, melt starts to be generated at 1200° C., and at the highest strength in the constituent mineral of the sintered ore, calcium ferrite having relatively high reducibility is generated. This is the reason that 1200° C. or higher is required as a sintering temperature. However, when the temperature rise further proceeds in excess of 1400° C., and precisely exceeds 1380° C., calcium ferrite starts to be decomposed into amorphous silicate (calcium silicate) having the lowest cold strength and reducibility, and skeleton crystal-like secondary hematite liable to be reduced and powdered. Also, from the results of the mineral synthetic test, as illustrated in the state diagram of FIG. 8, since the secondary hematite serving as an origin of reduction powdering of sintered ore rises to Mag.ss+Liq.zone, and is precipitated upon cooling, it is important to produce the sintered ore via a path of (2) rather than a path of (1) illustrated in the state diagram in suppressing the reduction powdering.

TABLE 1

| Type of mineral | Tensile strength (MPa) | Reducibility (%) |
|---|---|---|
| Hematite | 49 | 50 |
| Magnetite | 58 | 22 |
| Calcium ferrite | 102 | 35 |
| Calcium silicate | 19 | 3 |

That is, Non-Patent Document 1 discloses that, in securing the quality of sintered ore, very important management items are controls of the highest achieving temperature during combustion and the high-temperature zone retention time, the quality of the sintered ore is substantially determined by the controls. Therefore, in order to obtain the sintered ore with high strength, excellent reducibility, and excellent reduction powdering characteristics (RDI), it is important not to decompose calcium ferrite produced at a temperature of 1200° C. or higher into calcium silicate and secondary hematite, and in order not to do that, it is necessary to keep the temperature of the charged layer to 1200° C. (solidus temperature of calcium ferrite) or higher in a state in which the highest achieving temperature in the charged layer while sintering does not exceed 1400° C., preferably, does not exceed 1380° C. Hereinafter, in the present invention, the time kept at the temperature zone of 1200° C. or higher and 1400° C. or lower is referred to as a "high-temperature zone retention time".

In addition, conventionally, some techniques for keeping the upper layer part of the charged layer at a high temperature for a long time have been suggested. For example, Patent Document 1 suggests a technique that injects the gaseous fuel onto the charged layer after ignition to the charged layer, Patent Document 2 suggests a technique that adds a flammable gas into air sucked into the charged layer after ignition to the charged layer, Patent Document 3 suggests a technique that disposes a hood over the charged layer for increasing the temperature in the charged layer of the sintering raw material, and blows a mixed gas of air and the coke furnace gas from the hood at a position immediately after the ignition furnace, and Patent Document 4 suggests a technique that simultaneously blows the low-melting point solvent, the carbon material, and the combustible gas at the position immediately after the ignition furnace.

However, since these techniques use the gaseous fuel of high concentration and do not reduce the amount of carbon material when blowing the gaseous fuel, the highest achieving temperature in the charged layer while sintering becomes a high temperature exceeding 1400° C., as an upper limit temperature for the operating control, calcium ferrite generated in the sintering process is decomposed, the sintered ore having low reducibility and cold strength is generated and the gaseous fuel supply effect cannot be obtained, the air permeability is degraded by the temperature rise due to combustion of gaseous fuel and the thermal expansion, productivity is lowered, and further, there is a risk of causing a fire in an upper space of the sintering bed (charged layer) by the supply of gaseous fuel. Accordingly, none of the techniques leads to the practical use.

Accordingly, as a technique for solving the above-described problems, the inventors have developed a technique in which, after reducing the amount of carbon material to be added to the sintering raw material, the downstream of the ignition furnace of the sintering machine and the upper layer part of the charged layer lacking in the amount of heat required for sintering cause a sintering reaction, in a first half of the machine length of the sintering machine, various gaseous fuel diluted to the lower limit concentration of combustion or lower is introduced into the charged layer from the palette top, and the fuel is combusted inside the charged layer, thereby controlling both the highest achieving temperature in the charged layer and the high-temperature zone retention time within an appropriate range, and suggest the technique to Patent Documents 5 to 7.

In applying the techniques of the above-described Patent Documents 5 to 7 to the method for producing the sintered ore to reduce the amount of addition of carbon material to the sintering raw material, when the gaseous fuel diluted to a lower limit concentration of combustion or lower is charged into the charged layer and the gaseous fuel is combusted inside the charged layer, as illustrated in FIG. 9, since the gaseous fuel is combusted inside the charged layer (inside the sintered layer) after the carbon material is combusted, it is possible to expand the width of the combustion and melting zone in the thickness direction in a state in which the highest achieving temperature of the combustion and melting zone does not exceed 1400° C., thereby being able to effectively extend the high-temperature zone retention time.

PRIOR ART DOCUMENTS

Patent Documents

Patent Document 1: JP 48-018102 A
Patent Document 2: JP 46-027126 B
Patent Document 3: JP 55-018585 A Patent Document 4: JP 05-311257 A
Patent Document 5: WO 2007/052776 A
Patent Document 6: JP 2010-047801 A
Patent Document 7: JP 2008-291354 A Non Patent Documents Non Patent Document 1: "Mineral Engineering"; edited by Hideki Imai, Sukune Takenouchi, and Yoshinori Fujiki (1976), p. 175, Asakura Publishing Co., Ltd.

SUMMARY OF THE INVENTION

Task to be Solved by the Invention

As previously described, in order to produce a high-quality sintered ore having high strength and excellent reducibility at a high yield, it is necessary to secure the time (high-temperature zone retention time) kept at the high-temperature zone of 1200° C. or higher and 1400° C. or lower at least for a predetermined time or more. However, it is thought that the amount of air sucked into the raw material charged layer charged onto the pallet is not necessarily constant in the machine length direction. For example, the reason is that, along with movement of the pallet, that is, the progress of sintering, when the combustion and melting zone and the wet zone are formed inside the charged layer, as illustrated in FIG. 2, it is expected that the air-flow resistance in the charged layer changes, and the amount of air sucked into the charged layer in the machine length direction changes.

However, in the above-described techniques of Patent Documents 5 to 7, the amount of supply of the gaseous fuel was uniform in the machine length direction. Therefore, with respect to the upper layer part of the charged layer that lacks in heat required for sintering, a sufficient amount of gaseous fuel is not necessarily supplied, and thus the gaseous fuel supply effect may not be sufficiently obtained.

The present invention has been made in view of the above-described problems faced by the related art, and an object thereof is to provide a method for producing a sintered ore capable of producing a high-quality sintered ore having high strength and excellent reducibility at a high yield, by optimizing the supply ratio of the gaseous fuel supplied from each gaseous fuel supplying device after setting a constant total amount of supply of gaseous fuel.

Solution for Task

The inventors have repeated extensive studies to solve the above-described problems. As a result, it has found that, in a region supplied with the gaseous fuel, the amount of supply of the gaseous fuel is not constant in the machine length direction, and it is effective to change the amount of supply of gaseous fuel, depending on the amount of air (amount of wind, wind velocity) sucked into the charged layer of the sintering raw material, which leads to the development of the present invention.

That is, according to the present invention, there is provided a method for producing a sintered ore in which a sintering raw material containing powder ore and carbon material is charged onto a circularly moving pallet to form a charged layer, the carbon material of the charged layer surface is ignited, air above the charged layer containing the gaseous fuel supplied from a plurality of gaseous fuel supplying devices installed on downstream of an ignition furnace in a machine length direction is sucked by a wind box disposed below a pallet and is introduced into the charged layer, and the gaseous fuel and the carbon material are combusted within the charged layer to produce the sintered ore, wherein a total amount of supply of gaseous fuel supplied from each gaseous fuel supplying device is set to be constant, and an amount of supply of the gaseous fuel supplied from each gaseous fuel supplying device is increased or decreased depending on the amount of air sucked into the charged layer in a region in which each gaseous fuel supplying device is installed.

According to the method for producing the sintered ore of the present invention, the amount of supply of gaseous fuel supplied from the gaseous fuel supplying device is set to be equal to or greater than an amount that is proportional to the amount of air sucked into the charged layer in the gaseous fuel supply region of each gaseous fuel supplying device.

Furthermore, according to the method for producing the sintered ore of the present invention, the amount of supply of gaseous fuel supplied from the gaseous fuel supplying devices may be set to be equal to or greater than an amount that is proportional to a square of the amount of air sucked into the charged layer of the gaseous fuel supply region of each gaseous fuel supplying device.

Furthermore, according to the method for producing the sintered ore of the present invention, the gaseous fuel contained in the air introduced into the charged layer may be set to a lower limit concentration of combustion or lower.

Moreover, according to the method for producing the sintered ore of the present invention, the total amount of supply of the gaseous fuel may be in a range of 18 to 41 MJ/t-s in terms of combustion heat, and the carbon material of an amount exceeding the total amount of supply of the gaseous fuel may be reduced in terms of the combustion heat.

Effect of the Invention

According to the present invention, since the gaseous fuel is mainly supplied to the upper layer part of the sintering raw material charged layer in which heat required for sintering is most insufficient to express the maximum supply effects of gaseous fuel, it is possible to produce the high-quality sintered ore having high strength and excellent reducibility at a high yield that is capable of keeping the highest achieving temperature while sintering in almost all regions in the charged layer at a temperature zone of 1200° C. or higher and 1400° C. or lower for a long time.

EMBODIMENTS FOR CARRYING OUT THE INVENTION

The inventors measured changes in the machine length direction of the amount of air sucked and introduced into the charged layer from the top of the sintering raw material charged layer by a wind box disposed below a pallet in the two actual sintering machines A and B having specifications different from each other, as illustrated in Table 2. In the actual sintering machines A and B, an effective machine length of A is 82 m, an effective machine length of B is 74 m, and three gaseous fuel supplying devices having a length of 7.5 m are disposed in series after about 4 m of downstream sides of ignition furnaces of the both machines so that it is possible to separately control the amount of supply of gaseous fuel.

Figure 10:
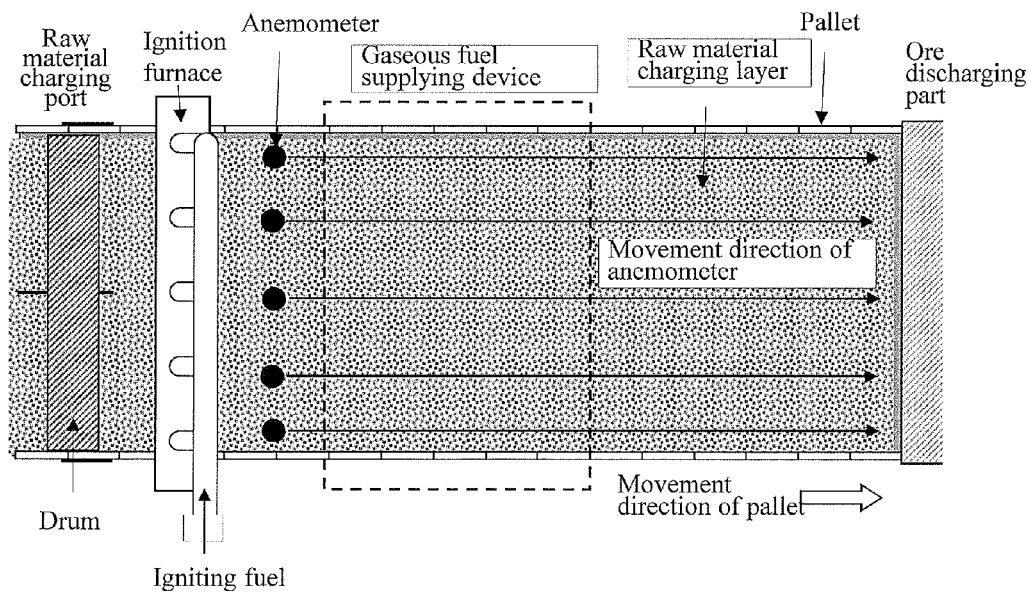
FIG. 10 is a diagram illustrating an example of a method of measuring an amount of air sucked and introduced into the charged layer.

In addition, the measurement of the amount of air sucked and introduced into the charged layer was performed, by installing a plurality (five in FIG. 10) of anemometers on the upper surface of the raw material charged layer in the width direction on an exit side of the ignition furnace as illustrated in FIG. 10, and by monitoring a change in wind velocity accompanied by the movement of the pallet, after stopping the supply of gaseous fuel and jacking up the gaseous fuel supplying device.

TABLE 2

| Sintering machine | Pellet width (m) | Effective machine length (m) | Supply length of gaseous fuel (m) | Supply range of gaseous fuel in effective machine length | Layer thickness (mm) |
|---|---|---|---|---|---|
| A | 5 | 82 | 7.5 × 3 = 22.5 | 0.05-0.32 | 700 |
| B | 4 | 74 | 7.5 × 3 = 22.5 | 0.07-0.36 | 560 |

Figure 1:
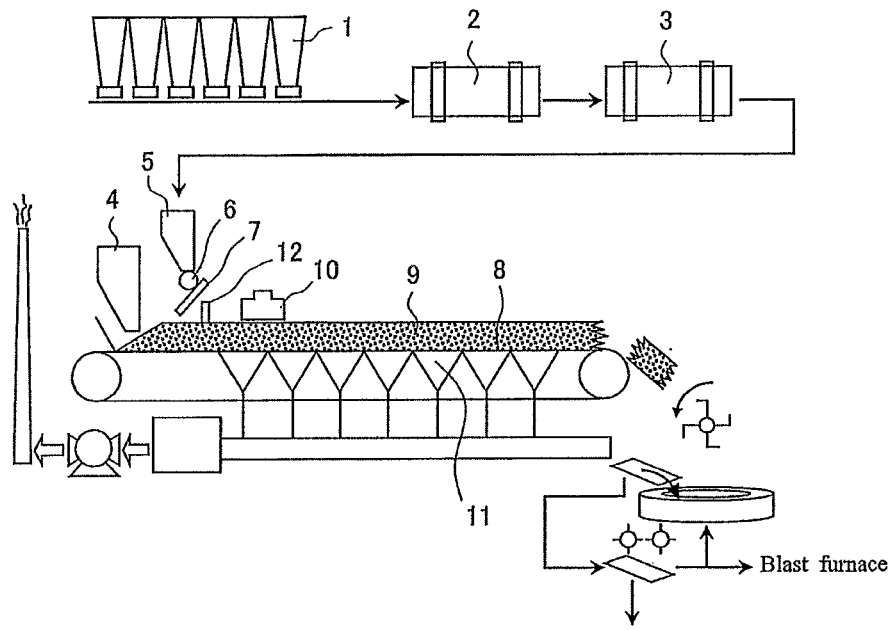
FIG. 1 is a schematic diagram illustrating a sintering process.
Figure 2:
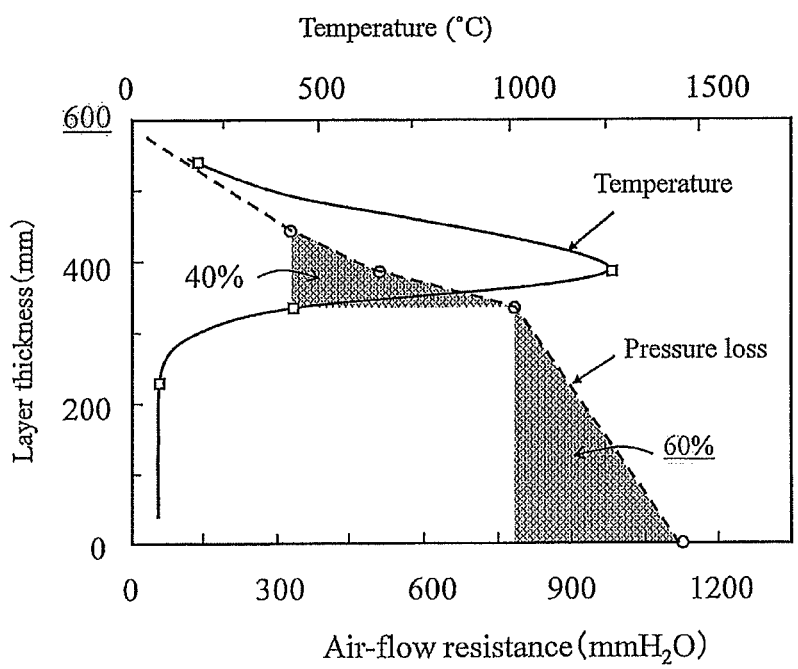
FIG. 2 is a graph illustrating a pressure loss distribution in a charged layer while sintering.
Figure 3:
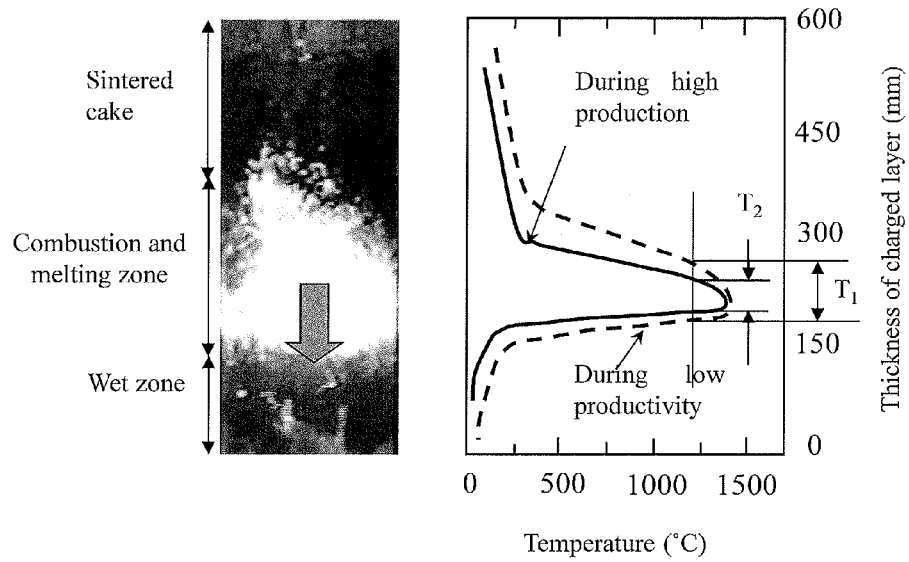
FIG. 3 is a graph illustrating a temperature distribution in the charged layer during high production and during low production.
Figure 4:
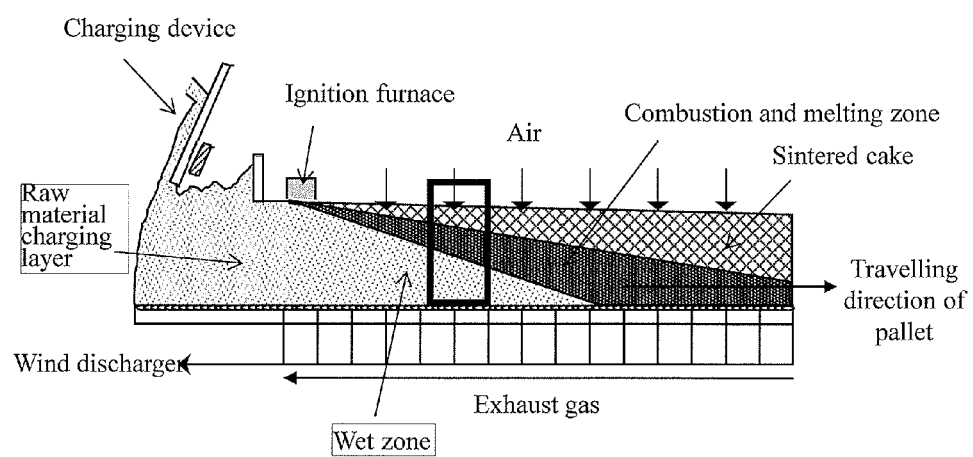
FIG. 4 is a schematic diagram illustrating changes in the charged layer accompanied by a progress of sintering.
Figure 5:
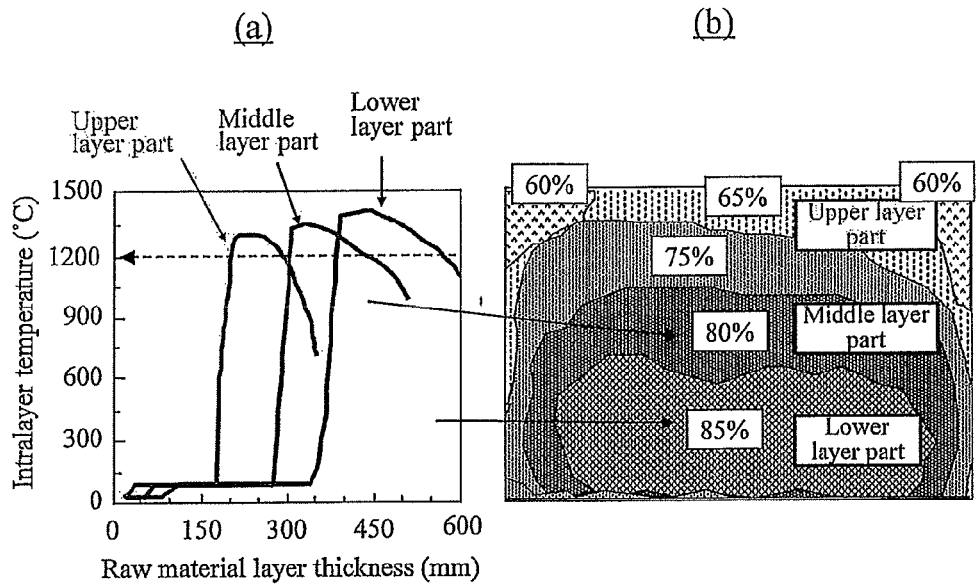
FIG. 5 is a diagram illustrating a temperature distribution when a combustion zone is present at each position of an upper layer part, an intermediate layer part and a lower layer part of the charged layer, and a yield distribution of sintered ore in a cross-section in a width direction of the charged layer.
Figure 6:
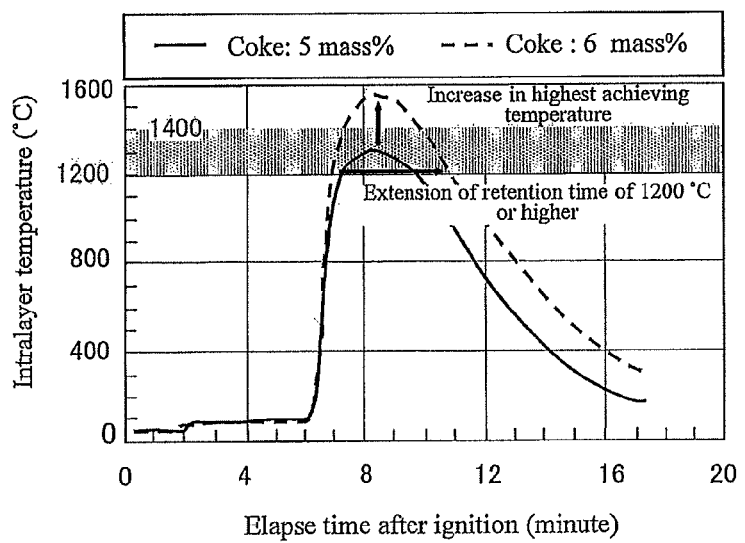
FIG. 6 is a diagram illustrating a temperature change in the charged layer in accordance with a change (increase) in the amount of carbon material.
Figure 7:
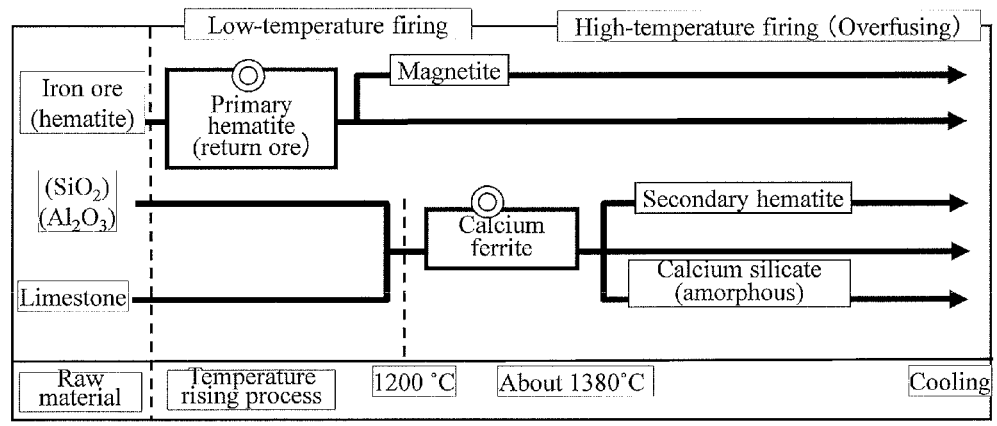
FIG. 7 is a diagram illustrating a sintering reaction.
Figure 8:
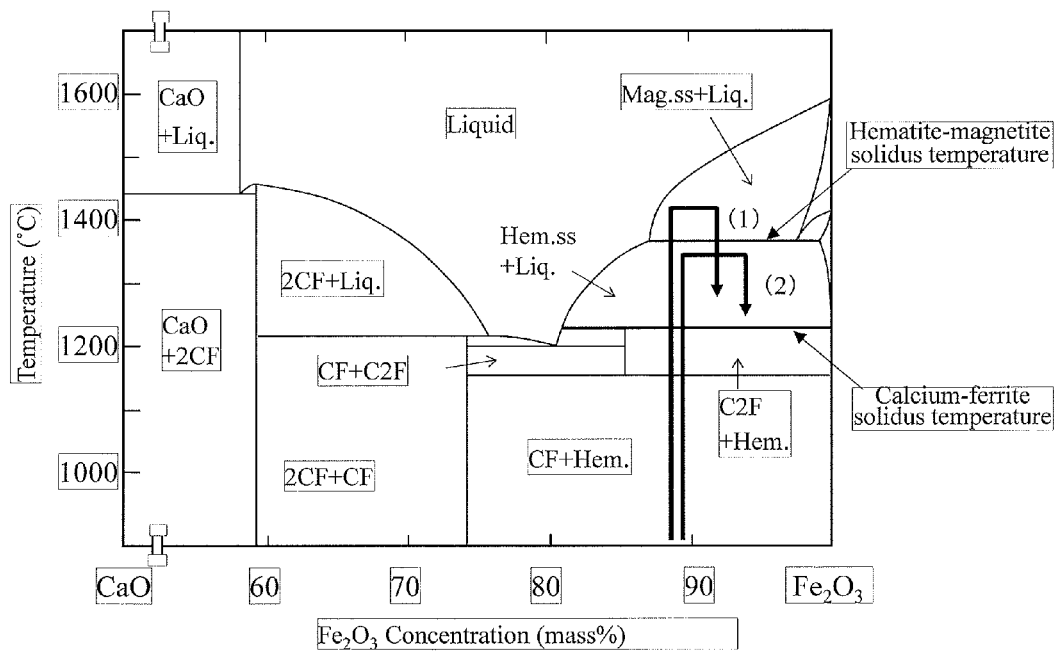
FIG. 8 is a state diagram illustrating a process generated by skeleton crystal-like secondary hematite.
Figure 9:
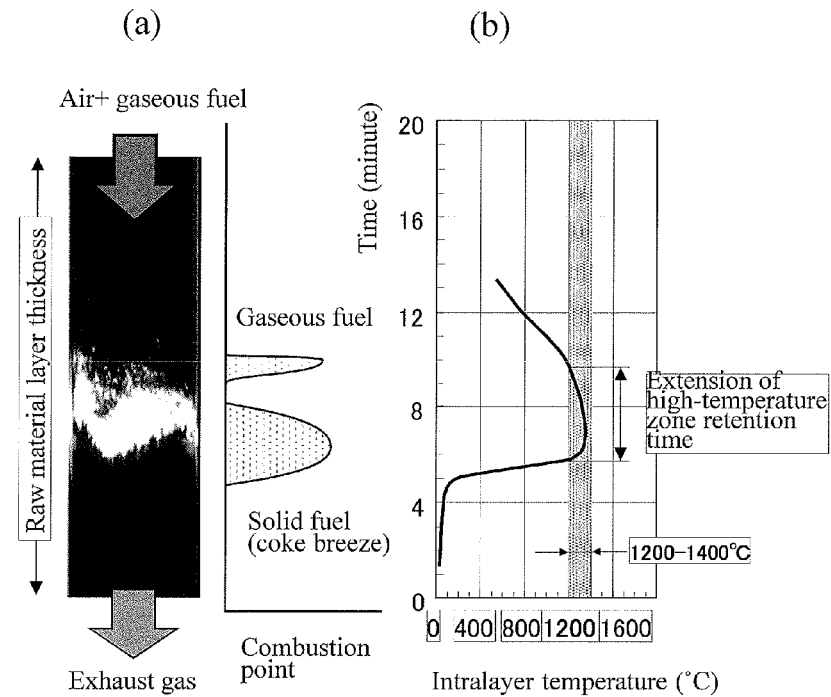
FIG. 9 is a schematic diagram illustrating the effect of the gaseous fuel supply on the high-temperature zone retention time.
Figure 11:
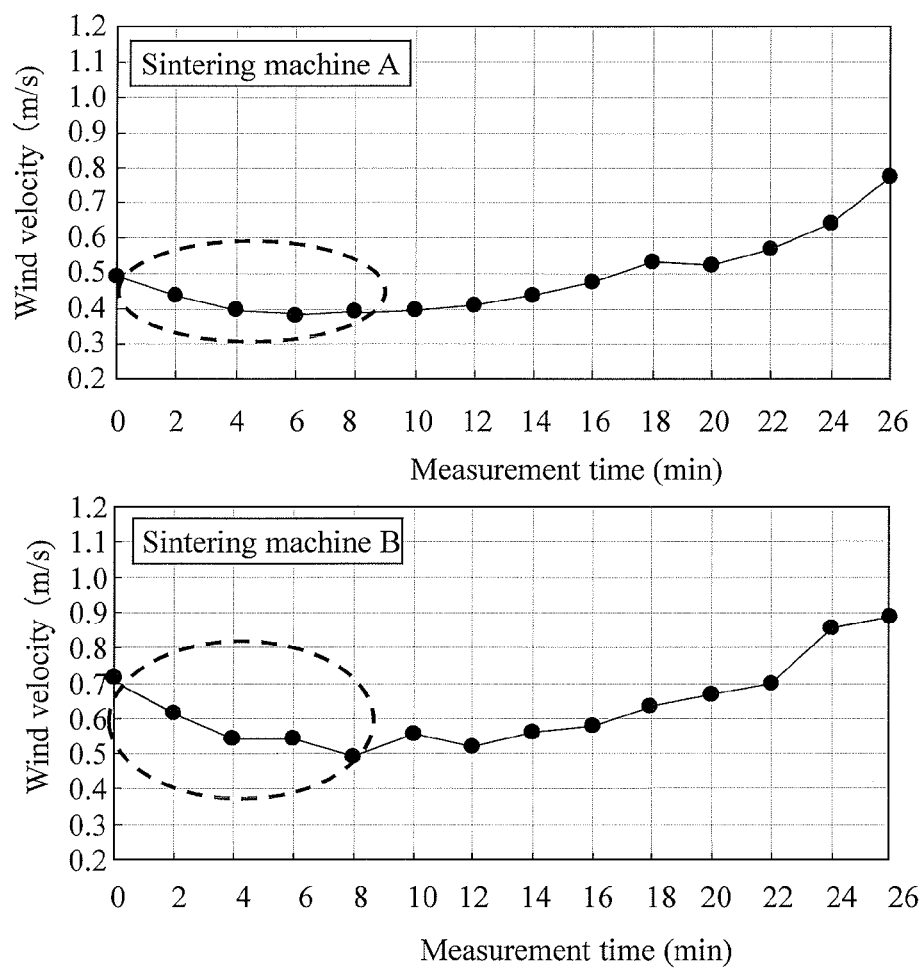
FIG. 11 is a graph illustrating an example of measurement result of a change in a machine length direction of the amount of air sucked and introduced into the charged layer.

\* Effective machine length: length from ignition furnace to ore discharge portion The results of measurement are illustrated in FIG. 11. From these results, it was checked that there is a tendency that, in the machine length direction of the sintering machine, the wind velocity of air sucked into the charged layer gradually decreases in the first half of the sintering, and conversely, the wind velocity gradually rises in the second half. Here, the decrease in the wind velocity after the start of sintering is thought to be due to the fact that the raw material charged layer deposited on the pallet causes the shrinkage by suction caused by the wind box disposed below the pallet and the density increase, or is thought to be due to an increase in the air-flow resistance caused by the formation of the combustion and melting zone and the wet zone accompanied by the progress of sintering, as shown in FIG. 2. Moreover, an increase in wind velocity in the sintering second half is thought to be due to the fact that, when sintering of the raw material charged layer progresses to a certain extent, the wet zone gradually disappears by heat caused by the exhaust gas, and the sintered cake in which sintering is completed has high porosity.

Figure 12:
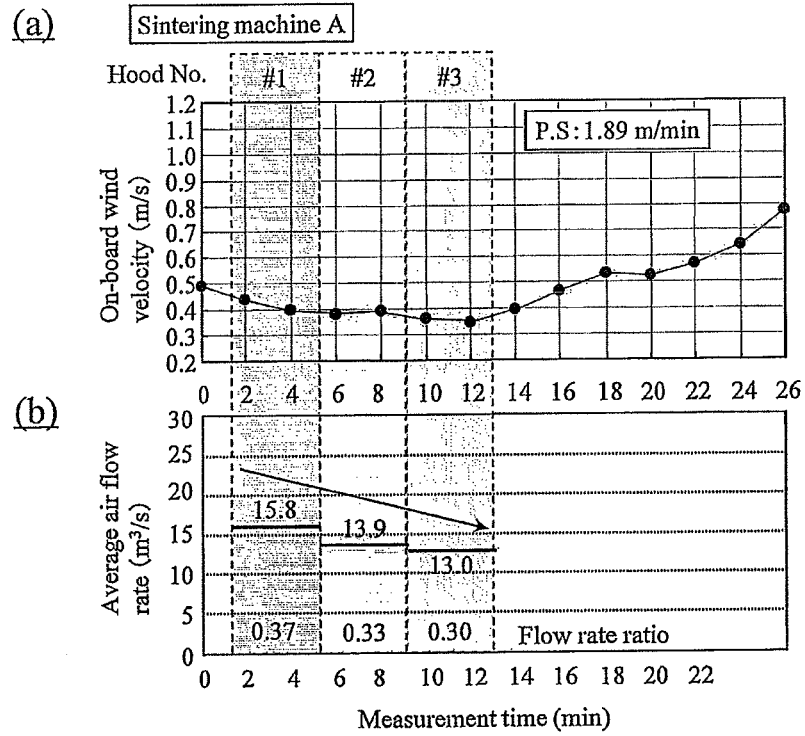
FIG. 12 is a graph illustrating installation positions of the gaseous fuel supplying device on FIG. 11 and changes in the amount of intake air in each device installation region.
Figure 12:
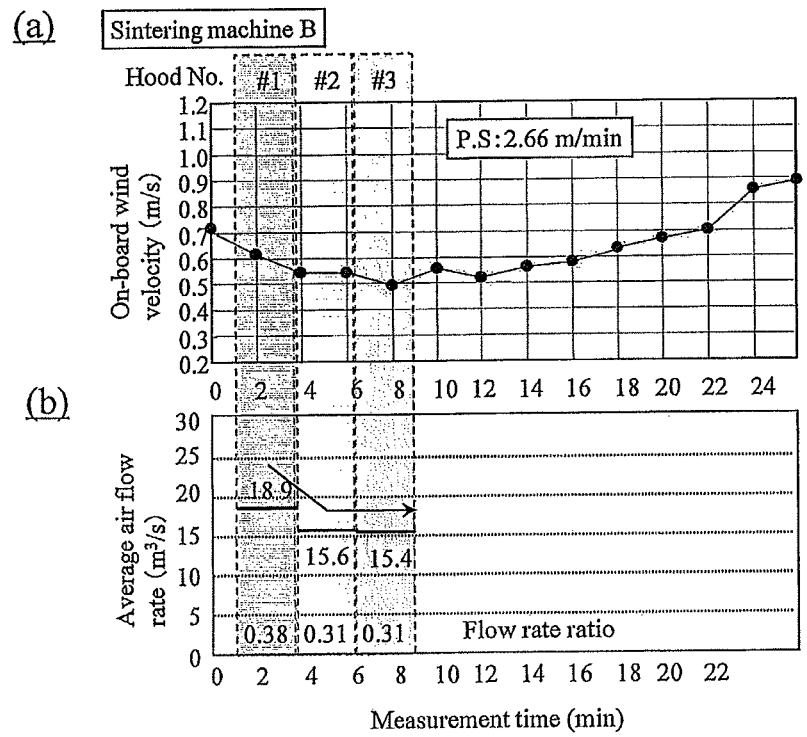

FIG. 12 illustrates a state in which the installation regions of three (#1 to #3) gaseous fuel supplying devices overlap in FIG. 11. From FIG. 12(*a*), it is understood that the region of the lowered wind velocity as described above substantially overlaps a region in which the gaseous fuel supplying device for compensating for the insufficient amount of heat required for sintering is installed. In addition, FIG. 12(*b*) illustrates a ratio of the amount of air converted from the wind velocity in each installation section of the three gaseous fuel supplying devices installed in each sintering machine and the amount of air in each installation section when the amount of air is 1.0 throughout the three devices. From these figures, it is understood that the amount of air in the installation section of the gaseous fuel supplying device of #3 decreases by about 20% from that of #1 in both the sintering machines A and B, but the amount of air gradually decreases from #1 to #3 in the sintering machine A, whereas the amount of air initially greatly decreases between #1 and #2 in the sintering machine B, and there is a difference in the way of decrease depending on the sintering machine.

The result shows that, in a case where the total amount of gaseous fuel supplied to the sintering machine is set to be constant, when the gaseous fuel supplied from a plurality of gaseous fuel supplying devices disposed in the machine length direction is uniformly supplied from the three gaseous fuel supplying devices as in the related art, the gaseous fuel introduced into the raw material charged layer becomes a low concentration on the upstream side and conversely becomes a high concentrations on the downstream side, as a result, the insufficient amount of heat of the upper layer portion of the raw material charged layer having a touch of shortage of the amount of heat required for sintering even just is not eliminated, meanwhile, excessive amount of heat is supplied to the lower part of the raw material charged layer lacking in the amount of heat required for sintering, and the situation differs depending on the sintering machine.

Therefore, the inventors have expressed the maximum gaseous fuel supply effects, by measuring the amount of air in the installation section of each gaseous fuel supplying device, and increasing or decreasing the amount of supply of gaseous fuel according to the measurement result, after setting the constant total amount of gaseous fuel supplied to the sintering machine.

Here, the reason for setting the constant total amount of gaseous fuel supplied to the sintering machine is that, when increasing the amount of supply of gaseous fuel from all the gaseous fuel supplying devices to set a concentration of the gaseous fuel on the upstream side to a predetermined concentration, a gaseous fuel than necessary is supplied to the downstream side, and thus it produces adverse effect, which leads to increased fuel costs.

In addition, it is preferred that the total amount of the gaseous fuel be supplied in a range of 18 to 41 MJ/t-s in terms of the combustion heat. The reason is that, if the range is less than 18 MJ/t-s, the quality improvement effect of the sintered ore due to the gaseous fuel supply is not sufficiently obtained, and whereas, even if the gaseous fuel is added in excess of 41 MJ/t-s, the above-described effects are saturated. A more preferred range is 21 to 29 MJ/t-s.

Also, when supplying the gaseous fuel, if an amount of addition of carbon material does not change, the total amount of combustion heat of the carbon material and the gaseous fuel increases, and the highest achieving temperature of the interior of the insertion layer may exceed 1400° C. For that reason, it is preferred to reduce the amount of addition of carbon material depending on the amount of supply of the gaseous fuel. It is preferred that the amount of reduction of carbon material in this case is greater than the amount of supply of gaseous fuel in terms of the combustion heat, and for example, even if an amount of 2 to 5 times is reduced, it is possible to obtain a sufficient effect of the present invention. Thus, the present invention has an effect of reducing the carbon dioxide emissions due to a reduction of carbon material usage, in addition to the effect of obtaining the high-quality sintered ore as described above.

Furthermore, the reason for increasing or decreasing the amount of supply of gaseous fuel depending on the amount of air at the installation section of each gaseous fuel supplying device is that, in response to the results illustrated in FIG. 12, by increasing the amount of the gaseous fuel supply from the gaseous fuel supplying device on the upstream side, and by decreasing the amount of gaseous fuel supply from the gaseous fuel supplying device on the downstream side, the uniform concentration of the gaseous fuel introduced into the charged layer is obtained in the machine length direction, and the expected gaseous fuel supply effect is also expressed in the upstream side.

Here, in order to sufficiently express the gaseous fuel supply effect, it is preferred that the amount of supply of gaseous fuel from each gaseous fuel supplying device is set to be equal to or greater than an amount that is proportional to the amount of air in the installation section of each device, but in order to effectively compensate for the insufficient amount of heat of the upper layer part of the charged layer, it is preferred that the amount of supply of gaseous is set to be equal to or greater than amount that is proportional to the square of the amount of air in the installation section of each device. However, when exceeding the amount that is proportional to the fifth power, since the gaseous fuel is excessively supplied only to the upstream side (for example, only #1 in FIG. 12) on which the combustion position of the gaseous fuel is close to the combustion position of the carbon material, that is, the combustion positions overlap each other, the highest achieving temperature rises too high by an increase in the temperature rise effect, oxygen in the air is consumed by combustion of the gaseous fuel of high concentration, and there is a risk of leading to shortage of oxygen used for combustion of coke breeze in the charged layer, and thus, the upper limit is more preferably approximately the fifth power. In addition, the amount to be proportional needs not to be strict, and as long as it is within a range of about ±20%, the amount may be appropriately adjusted in accordance with the characteristics of the sintering machine.

Furthermore, it is preferred that the gaseous fuel contained in the air introduced into the charged layer is at a lower limit concentration of combustion or lower of the gaseous fuel. The method of supplying the diluted gaseous fuel may be any of a method of supplying the air in which the gaseous fuel is diluted in advance to the lower limit concentration of combustion or lower, and a method of ejecting the gaseous fuel into air at a high speed to be instantaneously diluted to the lower limit concentration of combustion or lower. When the concentration of diluted gaseous fuel is higher than the lower limit concentration of combustion, the gaseous fuel is combusted above the charged layer, and the effect of supplying the gaseous fuel may be lost or flame or explosion may be caused. In addition, when the diluted gaseous fuel has a high concentration, since the fuel is combusted at a low-temperature zone of the sintered layer in which sintering is completed, there is a risk of failing to contribute effectively to extension of the high-temperature zone retention time. The concentration of the diluted gaseous fuel is preferably below ¾ of the lower limit concentration of combustion at an ordinary temperature in the air, more preferably, is below ⅕ of the lower limit concentration of combustion, and still more preferably, is below 1/10 of the lower limit concentration of combustion. However, if the concentration of the diluted gaseous fuel is less than 1/100 of the lower limit concentration of combustion, since the amount of heat generated by combustion is insufficient and the effects of improving the strength of the sintered ore and improving the yield are not obtained, the lower limit is set to 1% of the lower limit concentration of combustion. In terms of natural gas (LNG), since the lower limit concentration of combustion at room temperature of LNG is 4.8 vol %, the concentration of the diluted gaseous fuel is preferably in a range of 0.05 to 3.6 vol %, more preferably, is in a range of 0.05 to 1.0 vol %, and still more preferably, is in a range of 0.05 to 0.5 vol %.

EXAMPLE

In the actual sintering machines A and B illustrated in Table 2 described above, when performing the sintering operation by supplying the gaseous fuel as a sintering heat source, in addition to the carbon material, the present invention is applied to change the amount of supply of the gaseous fuel, by changing the amount of supply of gaseous fuel from each of three gaseous fuel supplying devices installed in series in the machine length direction to be proportional to the first power to the sixth power as illustrated in Table 3, depending on the wind velocity (amount of air) in the installation section of each gaseous fuel supplying device illustrated in FIG. 12. In addition, LNG is used as a gaseous fuel to be supplied, and the concentration of gaseous fuel after dilution is set to a constant level of 0.4 vol %. In addition, the effect of the application of the present invention is carried out by measuring the tumbler strength TI (JIS M8712) of the sintered cake discharged from the ore discharge portion of each sintering machine.

TABLE 3

| No. | Sintering machine | Gaseous fuel supply ratio of each gaseous fuel supplying device | | | Method of determining ratio | T1 strength improvement ratio (%) | Remarks |
| --- | --- | --- | --- | --- | --- | --- | --- |
| | | #1 | #2 | #3 | | | |
| 1 | A | 0.33 | 0.33 | 0.33 | Uniform | — | Comparative example |
| 2 | A | 0.37 | 0.33 | 0.30 | Proportion to first power | 1.8 | Invention Example |
| 3 | A | 0.45 | 0.31 | 0.2 | Proportion to third power | 2.7 | Invention Example |
| 4 | A | 0.56 | 0.26 | 0.18 | Proportion to sixth power | 1.1 | Invention Example |
| 5 | B | 0.33 | 0.33 | 0.33 | Uniform | — | Comparative example |
| 6 | B | 0.38 | 0.31 | 0.31 | Proportion to first power | 1.7 | Invention Example |
| 7 | B | 0.53 | 0.24 | 0.23 | Proportion to forth power | 2.8 | Invention Example |
| 8 | B | 0.62 | 0.20 | 0.18 | Proportion to sixth power | 1.0 | Invention Example |

Figure 13:
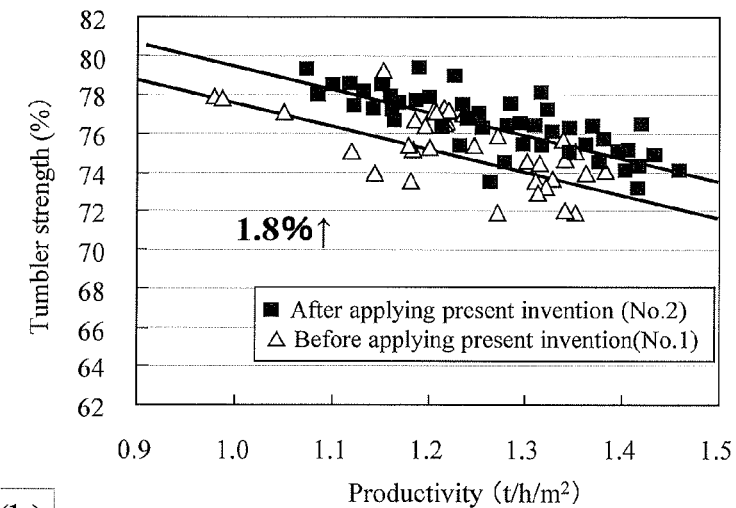
FIG. 13 is a graph illustrating effects of the invention on a relation between the productivity of a sintering machine A and tumbler strength TI.
Figure 13:
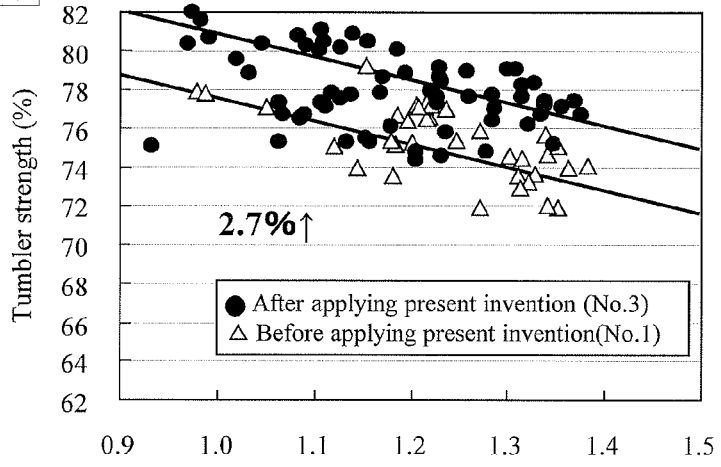
Figure 13:
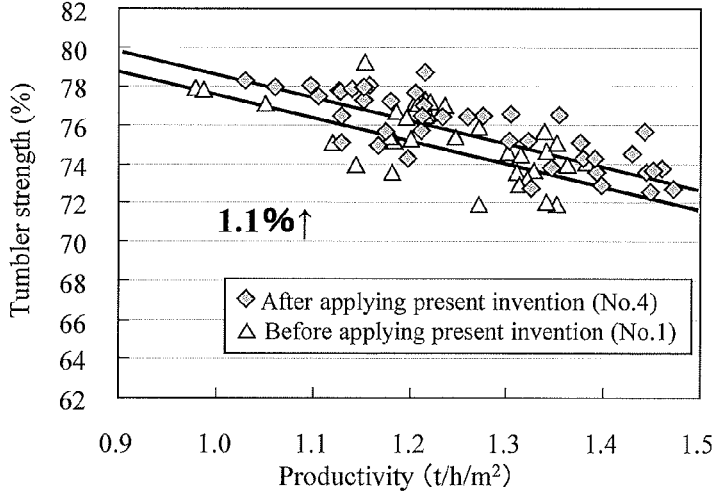
Figure 14:
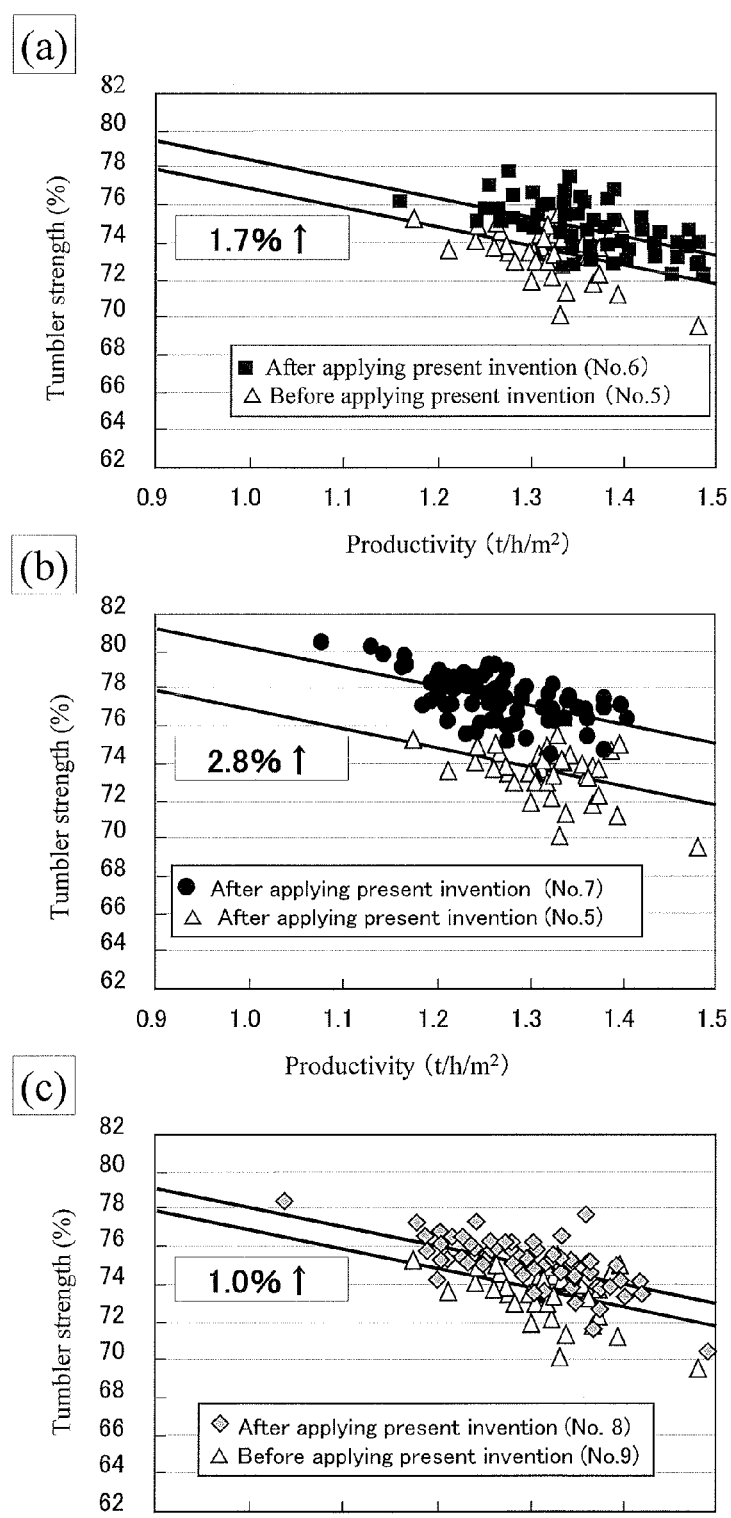
FIG. 14 is a graph illustrating effects of the invention on a relation between the productivity of a sintering machine B and tumbler strength TI.

The evaluation results of each of the above-described sintering conditions are illustrated in Table 3 as the improved values of the tumbler strength TI that is compared to a state before applying the present invention in the sintering machine, that is, a case where the amounts of supply of gaseous fuel from each of three gaseous fuel supplying devices are equal (0.33). From the results, it is understood that, by changing the amount of supply of gaseous fuel from the three gaseous fuel supplying devices depending on the amount of air sucked into the charged layer in each gaseous fuel supply region, it is possible to significantly improve the tumbler strength of the sintered ore, in other words, the yield of the finished product of the sintered ore. In addition, for reference, FIGS. 13 and 14 illustrate a ratio of the relation between the productivity of the sintering machine and the tumbler strength TI before applying the present invention to each of the sintering machines A and B (No. 1, No. 5) and the relation between the productivity of the sintering machine and the tumbler strength TI after applying the present invention (Nos. 2 to 4 and Nos. 6 to 8). From these figures, the effects of the present invention are also obvious.

INDUSTRIAL APPLICABILITY

The sintering technique of the present invention is useful as a technique of producing a sintered ore used as an iron making raw material, particularly, as a blast furnace raw material and can also be used as other ore agglomeration techniques.

DESCRIPTION OF REFERENCE SYMBOLS

1: raw material hopper
2, 3: drum mixer
4: bedding ore hopper
5: surge hopper
6: drum feeder
7: cutting shoot
8: pallet
9: charged layer
10: ignition furnace
11: wind box
12: cut-off plate

The invention claimed is:
1. A method for producing a sintered ore, the method comprising:
 charging a sintering raw material including powder ore and carbon material onto a circularly moving pallet to form a charged layer;
 igniting the carbon material on a surface of the charged layer;
 supplying a gaseous fuel from a plurality of gaseous fuel supplying devices installed downstream of an ignition furnace in a machine length direction, a total amount of supply of the gaseous fuel supplied from the gaseous fuel supplying devices being set to be constant;
 sucking air above the charged layer using a wind box disposed below the pallet and introducing the air into the charged layer, the air including the gaseous fuel;
 increasing or decreasing an amount of supply of the gaseous fuel supplied from each gaseous fuel supplying device depending on an amount of air sucked into the charged layer in a region in which each gaseous fuel supplying device is installed; and
 combusting the gaseous fuel and the carbon material within the charged layer to produce the sintered ore.

2. The method for producing the sintered ore according to claim 1, wherein the amount of supply of the gaseous fuel supplied from the gaseous fuel supplying devices is set to be equal to or greater than an amount that is proportional to the amount of air sucked into the charged layer of the gaseous fuel supply region of each gaseous fuel supplying device.

3. The method for producing the sintered ore according to claim 2, wherein the amount of supply of the gaseous fuel supplied from the gaseous fuel supplying devices is set to be equal to or greater than an amount that is proportional to a square of the amount of air sucked into the charged layer of the gaseous fuel supply region of each gaseous fuel supplying device.

4. The method for producing the sintered ore according to claim 3, wherein the gaseous fuel contained in the air introduced into the charged layer is set to a lower limit concentration of combustion or lower.

5. The method for producing the sintered ore according to claim 4, wherein the total amount of supply of the gaseous fuel is set in a range of 18 to 41 MJ/t-s in terms of combustion heat, and the carbon material of an amount exceeding the total amount of supply of the gaseous fuel is reduced in terms of the combustion heat.

6. The method for producing the sintered ore according to claim 3, wherein the total amount of supply of the gaseous fuel is set in a range of 18 to 41 MJ/t-s in terms of combustion heat, and the carbon material of an amount exceeding the total amount of supply of the gaseous fuel is reduced in terms of the combustion heat.

7. The method for producing the sintered ore according to claim 2, wherein the gaseous fuel contained in the air introduced into the charged layer is set to a lower limit concentration of combustion or lower.

8. The method for producing the sintered ore according to claim 7, wherein the total amount of supply of the gaseous fuel is set in a range of 18 to 41 MJ/t-s in terms of combustion heat, and the carbon material of an amount exceeding the total amount of supply of the gaseous fuel is reduced in terms of the combustion heat.

9. The method for producing the sintered ore according to claim 2, wherein the total amount of supply of the gaseous fuel is set in a range of 18 to 41 MJ/t-s in terms of combustion heat, and the carbon material of an amount exceeding the total amount of supply of the gaseous fuel is reduced in terms of the combustion heat.

10. The method for producing the sintered ore according to claim 1, wherein the amount of supply of the gaseous fuel supplied from the gaseous fuel supplying devices is set to be equal to or greater than an amount that is proportional to a square of the amount of air sucked into the charged layer of the gaseous fuel supply region of each gaseous fuel supplying device.

11. The method for producing the sintered ore according to claim 10, wherein the gaseous fuel contained in the air introduced into the charged layer is set to a lower limit concentration of combustion or lower.

12. The method for producing the sintered ore according to claim 11, wherein the total amount of supply of the gaseous fuel is set in a range of 18 to 41 MJ/t-s in terms of combustion heat, and the carbon material of an amount exceeding the total amount of supply of the gaseous fuel is reduced in terms of the combustion heat.

13. The method for producing the sintered ore according to claim 10, wherein the total amount of supply of the gaseous fuel is set in a range of 18 to 41 MJ/t-s in terms of combustion heat, and the carbon material of an amount exceeding the total amount of supply of the gaseous fuel is reduced in terms of the combustion heat.

14. The method for producing the sintered ore according to claim 1, wherein the gaseous fuel contained in the air introduced into the charged layer is set to a lower limit concentration of combustion or lower.

15. The method for producing the sintered ore according to claim 14, wherein the total amount of supply of the gaseous fuel is set in a range of 18 to 41 MJ/t-s in terms of combustion heat, and the carbon material of an amount exceeding the total amount of supply of the gaseous fuel is reduced in terms of the combustion heat.

16. The method for producing the sintered ore according to claim 1, wherein the total amount of supply of the gaseous fuel is set in a range of 18 to 41 MJ/t-s in terms of combustion heat, and the carbon material of an amount exceeding the total amount of supply of the gaseous fuel is reduced in terms of the combustion heat.

17. The method for producing the sintered ore according to claim 1, further comprising measuring the amount of air sucked into the charged layer in the region in which each gaseous fuel supplying device is installed before increasing or decreasing the amount of supply of the gaseous fuel supplied from each gaseous fuel supplying device.

* * * * *